United States Patent
Wendt et al.

(10) Patent No.: US 6,878,050 B2
(45) Date of Patent: Apr. 12, 2005

(54) PROTECTIVE DEVICE FOR A HAND MACHINE TOOL

(75) Inventors: Dieter Wendt, Esslingen (DE); Mike Voigt, Gaildorf (DE); Albert Kleider, Schwaebisch Hall (DE); Joachim Schadow, Dettenhausen (DE); Kurt Neef, Gaildorf (DE); Ulrich Mueller-Boysen, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/344,029

(22) PCT Filed: Jun. 22, 2002

(86) PCT No.: PCT/DE02/02300

§ 371 (c)(1),
(2), (4) Date: Feb. 6, 2003

(87) PCT Pub. No.: WO03/004218

PCT Pub. Date: Jan. 16, 2003

(65) Prior Publication Data

US 2004/0157540 A1 Aug. 12, 2004

(30) Foreign Application Priority Data

Jun. 29, 2001 (DE) .......................... 101 31 266

(51) Int. Cl.[7] .......................... B24B 55/04; B24B 23/00
(52) U.S. Cl. ........................ 451/451; 451/344; 451/358; 451/453
(58) Field of Search .................. 451/451, 453, 451/456, 358, 353, 344; 83/100; 30/390

(56) References Cited

U.S. PATENT DOCUMENTS

| | | | | |
|---|---|---|---|---|
| 4,253,362 A | * | 3/1981 | Olson | 83/100 |
| 5,084,972 A | * | 2/1992 | Waugh | 83/100 |
| 5,146,682 A | | 9/1992 | Bloechle et al. | |
| 5,167,215 A | * | 12/1992 | Harding, Jr. | 451/456 |
| 5,327,649 A | * | 7/1994 | Skinner | 30/390 |
| 5,440,809 A | * | 8/1995 | Padilla | 451/451 |
| 5,931,072 A | * | 8/1999 | Shibata | 451/453 |
| 6,503,125 B1 | * | 1/2003 | Harrington | 451/28 |
| 6,648,742 B1 | * | 11/2003 | Segiel Jr. | 451/451 |

FOREIGN PATENT DOCUMENTS

| | | |
|---|---|---|
| DE | 36 35 159 A1 | 4/1988 |
| DE | 198 29 190 A1 | 1/2000 |
| GB | 2 196 898 A | 5/1988 |
| WO | 90/06832 | 6/1990 |

* cited by examiner

*Primary Examiner*—Hadi Shakeri
(74) *Attorney, Agent, or Firm*—Michael J. Striker (57) ABSTRACT

The invention is based on a guard device (33) for a power tool, in particular for a sanding power tool, having a protective cover (40) that is provided to at least partially encompass a disk-shaped, rotating tool, and having a dust removal tube (52), the longitudinal axis of which is located at an angle of up to 80° to the axis of rotation of the tool.

It is proposed that part of the dust removal tube (52) passes through the plane of a flat side of the tool.

11 Claims, 10 Drawing Sheets

PROTECTIVE DEVICE FOR A HAND MACHINE TOOL

BACKGROUND OF THE INVENTION

The invention is based on a guard device for a power tool, in particular for a sanding power tool.

Guard devices for power tools, in particular for angle grinders, are known, the protective covers of which offer a certain level of protection during sanding work, but do not support sufficient dust removal despite the powerful external vacuum cleaners typically used. Additionally, the typical, radial routing of the suction tube makes handling the power tool difficult because the suction tube protrudes radially.

SUMMARY OF THE INVENTION

The invention is based on a guard device for a power tool, in particular for a sanding power tool, having a protective cover that is provided to at least partially encompass a disk-shaped, rotating tool, and having a dust removal tube, the longitudinal axis of which is located at an angle of up to 80° to the axis of rotation of the tool.

It is proposed that part of the dust removal tube passes through the plane of a flat side of the tool.

Good handling of the power tool is obtained by means of the slanted routing of the dust removal tube, whereby, simultaneously, particularly effective dust removal is obtained by means of the design of the dust removal tube, so that, in most cases, neither an internal ventilator nor an external vacuum cleaner are needed. This is essentially achieved in that at least some of particles or sanding dust cast off by the tool are thrown directly into the interior of the dust removal tube and do not first have to find their way from the inside of the protective cover to the opening of the dust removal tube. Additionally, the part of the dust removal tube that passes through the plane of a flat side of the tool usually forms a bent surface that is a conducting surface, and directs the conveying air stream produced by the rapid rotation of the tool from inside the protective cover into the dust removal tube with only minimal energy loss.

The dust removal tube located at a slant to the axis of rotation of the tool makes good dust removal possible without external vacuuming due to the defined natural motion of the dust particles, and allows good freedom of motion while working. The sanding dust is captured and removed particularly well due to the over-the-corner location of the dust removal tube immediately next to the site where the tools exits a work piece surface.

A particularly advantageous redirection of the conveying air and the particles is obtained in that the tool—with its radially outermost region—passes through an opening in the dust removal tube. The periphery of the disk-shaped tool is therefore at least partially encompassed by a part of the dust removal tool. As a result, conveying air and particles on both sides of the plane of rotation of the tool are guided directly into the dust removal tool. The opening can be designed as a slot, for example, into which the periphery of the tool enters. The geometery, e.g., the bend, of the part of the dust removal tube that forms the opening can differ from the geometry of the adjacent part of the dust removal tube. For example, the dust removal tube—in the part of it that encompasses the tool—can be bent upward or downward, or it can have another form appearing favorable to one skilled in the art.

Advantageously, the part of the dust removal tube that passes through the plane of the flat side of the tool is situated so that sanding dust drawn off of a work piece by the tool is set into a rotational motion in the dust removal tube. When the conveying air stream with the sanding dust meets this part of the dust removal tube, the air and sanding dust are further directed into the dust removal tube in such a fashion that they execute a cyclone-like vortex motion in the dust removal tube. The conveying air and dust stream set into rotational motion in this fashion can have sufficient kinetic energy to exit the dust removal tube on its side furthest from the tool under its own power.

Due to the fact that the dust removal tube tapers toward its mouth pointing toward the tool, the natural motion of the dust particles and the blow-off effect are markedly improved by means of the air movement created by the rotating sanding disk. The conveying air stream flows rapidly in the axial direction of the dust removal tube through the constriction in the mouth of the dust removal tube and therefore leaves the inner space of the protective cover with great speed. If the air also executes a rotating motion in the dust removal tube, the air stream develops a suction effect due to the widening of the dust removal tube in the direction away from the protective cover, which said suction effect helps the air to exit the protective cover and enter the dust removal tube.

In an advantageous embodiment of the invention, the guard device comprises a fastening device to fasten the protective cover to the power tool, whereby the dust removal tube is moveably supported relative to the fastening device. In this fashion, the dust removal tube can be held moveably in relation to the tool and, therefore, independent of the depth of penetration of the tool in a work piece with a constant, e.g., very small clearance. As a result, the mouth of the dust removal tool can be positioned very close to the site where the particles leave the work piece, by way of which good removal of the particles is obtained.

Advantageously, the dust removal tube is fastened to the protective cover. In this fashion, it is positioned in a way that is stable and easy to produce.

Particularly good sanding dust removal can be achieved when the protective cover is intended—in a state in which it lies on a flat work piece in the operating position—to encompass the tool together with the work piece to an extent that does not depend on the depth of penetration of the tool in the work piece. The work piece can be encompassed entirely or to a predetermined extent, so that, when the tool is pulled out of the work piece, for example, no dust or no additional dust leaves the protective cover and enters the surroundings.

A guard device, the protective cover of which completely encompasses the tool in the axial direction in the resting position, ensures a high level of work safety: an operator is effectively protected against injury caused by the tool. This also applies for a guard device, in the case of which the tool retracts completely into the protective cover when it exits the work piece. Additionally, such a guard device ensures good protection against the release of sanding dust or particles. The dust rotating with the tool is drawn into the protective cover along with the tool retracting into the protective cover.

Advantageously, the protective cover comprises an exit region in which the tool partially exits the protective cover during operation, whereby the protective cover has a glide shoe in the exit region, and the dust removal tube is permanently interconnected with the glide shoe. The glide shoe guides the protective cover along the work piece and holds the dust removal tube at a constant distance from the work piece. In this fashion, the mouth of the dust removal tube can be positioned in such a way that it points in the direction of flight of the particles.

If the glide shoe constricts the cross section of the exit region in the region of the dust removal tube, it is more difficult for air to escape out of the protective cover. Excess pressure forms inside the protective cover that presses the air containing particles or dust toward the dust removal tube.

Advantageously, an air inlet opening remains in the protective cover or between the protective cover and the work piece, the size of which is independent of the depth of penetration of the tool in the work piece. In this fashion, a constant flow of air—that is independent of the depth of penetration of the tool in the work piece—from the air inlet opening into a dust removal tube, and, therefore, constant dust removal, is made possible.

When the air inlet opening is located opposite from the dust removal tube relative to the tool, an air stream directed toward the dust removal tube is obtained that facilitates entry of dust into the dust removal tube.

The blow-off effect of the sanding dust is further improved by means of a damping plate located inside the protective cover, since the air whirled by the rotating sanding disk backs up there, and the air stream is directed out to the dust removal tube. The damping plate can be located on the side opposite from the dust removal tube and be integrally molded on the protective cover, for example.

A further advantage is achieved in that the protective cover comprises a window that provides an operator with a view of the tool and, in particular, on the side of the tool closest to a work piece. A particularly easy and good control of the tool position in the work piece is therefore possible.

Advantageously, the protective cover comprises an observation slit. It can be formed by means of an opening in the protective cover, for example, or by means of a slant in part of the protective cover. The observation slit directed toward the narrow side of the sanding disk ensures a more controlled handling of the angle grinder with the protective cover, mainly for exact placement of the sanding disk in mortar joints. Visual control of the tool is particularly enhanced by means of the window in combination with an observation slit. The air inlet opening can be used as an observation slit. The air drawn in through the observation slit causes turbulence that essentially keeps the window free from dust. When the dust is removed from the opposite side of the window, e.g., by a dust removal tube located there, the window remains essentially free from dust as a result of the air turbulence.

BRIEF DESCRIPTION OF THE DRAWINGS

Further advantages result from the following description of the drawings. An exemplary embodiment of the invention is presented in the drawings. The drawings, the description, and the claims contain numerous features in combination. One skilled in the art will advantageously consider them individually as well and combine them into reasonable further combinations.

DETAILED DESCRIPTION OF THE PREFERRED EMBODIMENTS

Figure 1:
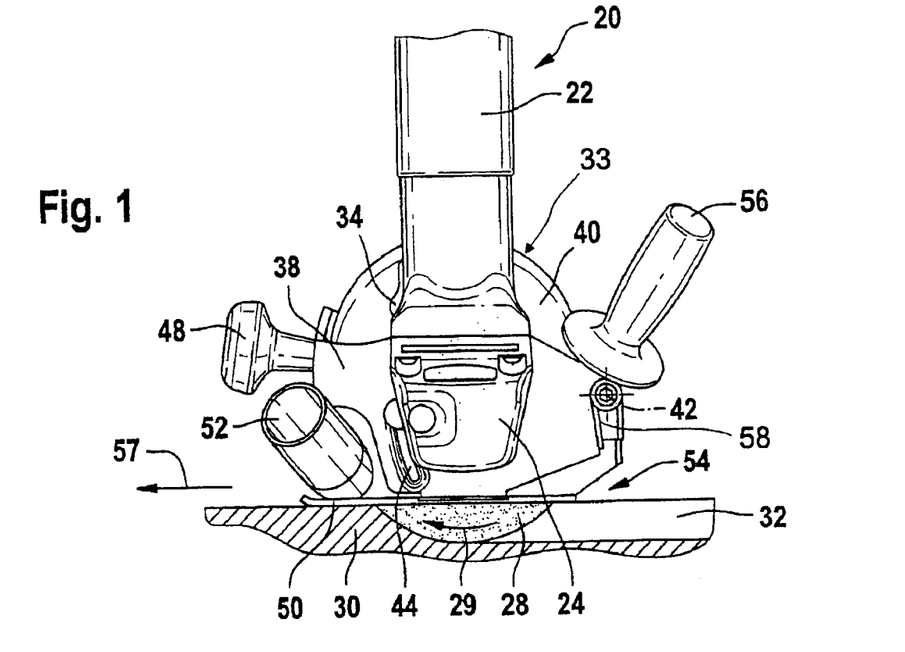
FIG. 1 is a top view of a power tool having a guard device according to the invention, in the working position.

FIG. 1 is the side view of an angle grinder 20, the motor housing 22 of which extends substantially upward at a right angle and contains a not-shown motor.

As viewed downward at a right angle, a gearbox housing 24 adjoins the motor housing 22, the drive shaft 26 (FIG. 13) of which said gearbox housing extends at a right angle to the plane of the drawing and carries a tool on its exposed end. The tool is a sanding disk 28. It rotates in the direction of rotation 29 in a clockwise direction and plunges into a work piece 30, in which it cuts a groove 32 coming from the right.

As shown on the left side, a sliding button 34 of an on-and-off switch is attached to the motor housing 22.

A guard device 33 is fastened to the angle grinder 20. It comprises a fastening device and a protective cover 40. The fastening device is designed as a swivelling arm 38. The swivelling arm 38 is fastened via a well-fitting mounting opening 36 (FIG. 18) to a cylindrically designed, axial extension of the gearbox housing 24, i.e., the neck 25. The swivelling arm 38, in turn, is fastened to the protective cover 40 and is capable of being swivelled upward and downward around a center of rotation 42. The swivelling arm 38 and the protective cover 40 are reliably guided in opposition to each other by means of a guide bolt 46 seated on the protective cover 40 in a guide slot 44 of the swivelling arm 38. As shown on the left side, the swivelling arm 38 carries a knob 48, by way of which the angle grinder 20 with the protective cover 40 can be guided on a work piece 30. The knob 48 is also grasped to manually adjust the depth of cut, whereby the swivelling arm 38 can be adjusted upward and downward. The protective cover 40 is seated on the work piece 30 with a guide means, i.e., a rail 50 designed in the shape of a runner, located on its bottom side. The guide means ensures that the protective cover 40 remains perpendicular to the surface of the work piece.

As shown on the bottom left, the protective cover 40 carries a dust removal tube 52 directly adjacent to the rail 50. Dust created during sanding is removed through said dust removal tube, e.g., via an inserted tube piece and a dust suctioning device attached thereto. The dust removal tube 52 is situated at a 45° angle relative to the axis of rotation of the sanding disk.

As shown on the bottom right, the protective cover 40 is angled at a slant in the upward direction, so that an observation opening 54 is formed, through which the tool operator can control the engagement of the sanding disk 28 in the work piece 30 and/or the groove 32. As shown at the top right, a handle 56 projects out of the protective cover 40 at an angle, by way of which the unit comprising angle grinder 20 and protective cover 40 can be comfortably guided along the work piece 30.

A spring mechanism is located between the swivelling arm 38 and the protective cover 40 at the center of rotation 42. The spring mechanism comprises a preloaded leg spring 58 that tries to press the swivelling arm 38 upward. As a result, the angle grinder 20 must be moved relative to the protective cover 40 according to FIG. 1 in a counterclockwise direction against the spring force of the leg spring 58 in order to reach its working position in which the sanding disk 28 protrudes downward out of the pass-through slot 73 (FIG. 17) and/or past the rail 50 so that it can penetrate the work piece 30.

If the angle grinder 20 with the protective cover 40 is lifted off of the work piece 30, the leg spring 58 pulls the protective cover 40 downward relative to the swivelling arm 38, so that the sanding disk 28 disappears completely inside the protective cover 40.

The usual method of working with the angle grinder 20 is in the advancing direction 57, so that the work piece 30 and the direction of rotation 29 are opposite to the direction of rotation 29 of the sanding disk 28.

Figure 2:
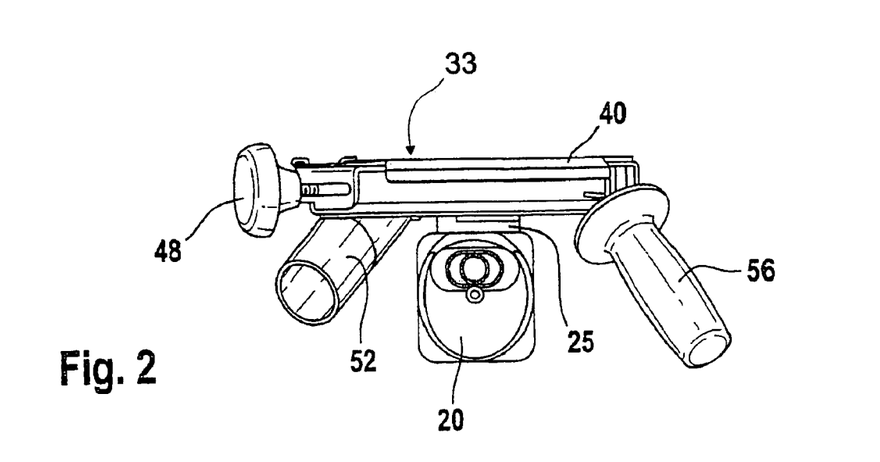
FIG. 2 is a view of the power tool in FIG. 1 from above.

The view from the top shown in FIG. 2 shows the slanted arrangement of the handle 56 on the protective cover 40, and the slanted extension of the dust removal tube 52. Moreover, the neck 25 of the gearbox housing 24 is shown, which said neck engages in the mounting opening 36 of the swivelling arm 38.

Figure 3:
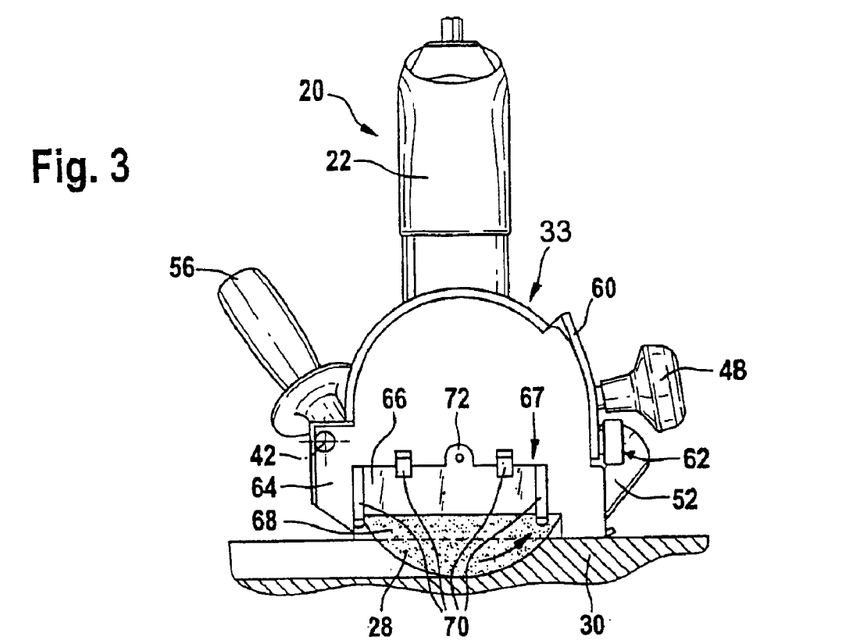
FIG. 3 is a view of the power tool in FIG. 1 from the opposite side.
Figure 14:
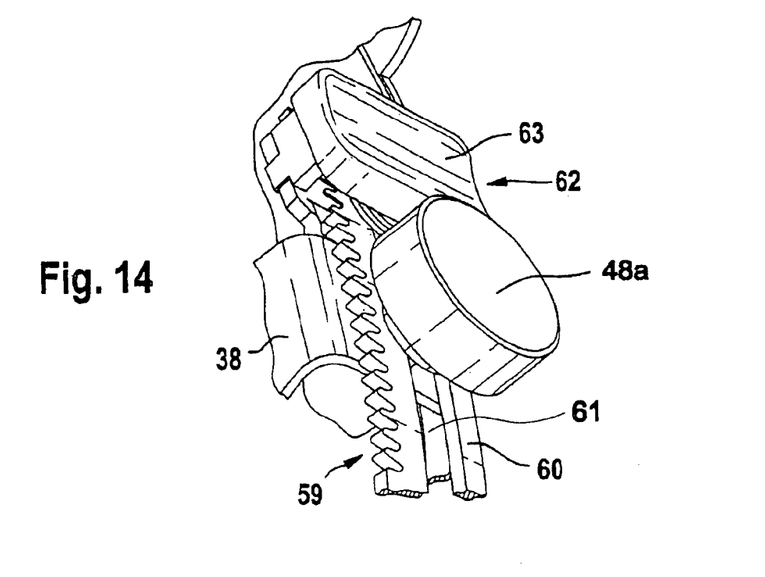
FIG. 14 is a view of the adjustable stop for limiting the depth of cut.
Figure 15:
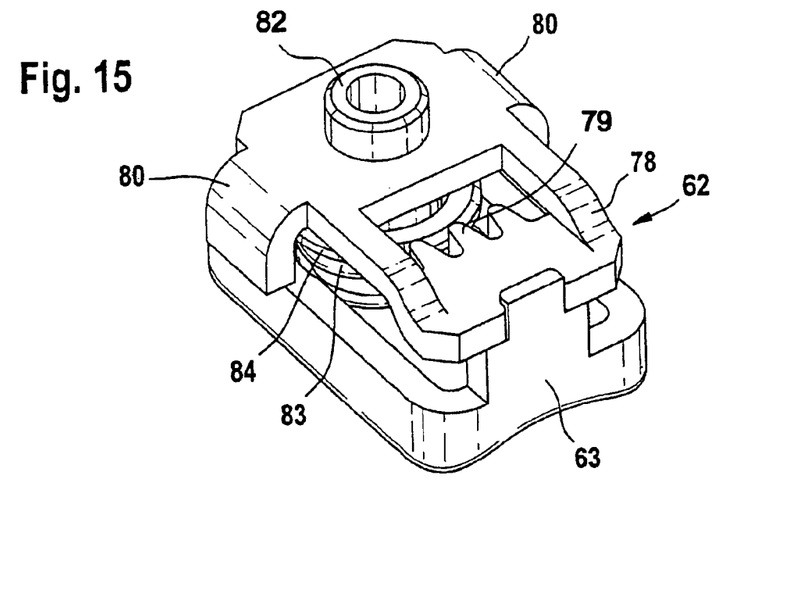
FIG. 15 is a detailed view of the depth-of-cut stop.

FIG. 3 shows the angle grinder 20 with protective cover 40 according to FIG. 1 from the opposite side, also in the working position, with the sanding disk 28 protruding far downward. A guide rule 60 is shown in FIG. 3, on which the knob 48 is guided and which can be locked in position by rotating it around its longitudinal axis. Furthermore, a depth-of-cut stop 62 is shown below the knob 48, which said depth-of-cut stop is also capable of being displaced in the guide rule 60 and which is capable of being locked in position with positive engagement in preselected, stepped positions by the press of a button. The depth-of-cut stop 62 is captively secured on the guide rule 60 (FIGS. 14, 15).

The guard device 33 comprises two units capable of being moved opposite to one another, i.e., the protective cover 40 and a pivoted cover plate 64. The pivoted cover plate 64 is located on the opposite side of the swivelling arm 38 and is intended to cover the sanding disk 68. The pivoted cover plate 64 is capable of being swivelled together with the protective cover 40 around the center of rotation 42. To replace the sanding disk 28, the pivoted cover plate 64 is swivelled toward the upper left—as viewed in this drawing—from the operating position into a tool replacement position. In this outwardly swivelled tool replacement position, the exposed end of the driven shaft 26 and/or the retaining nut 27 (FIG. 13) are easily accessible, so that, after the retaining nut 27 is loosened, the sanding disk 28 can be removed in the axial direction out of the plane of the drawing.

In its lower region, the pivoted cover plate 64 comprises a window 66 in a rectangular opening. Located between the window 66 and the rail 50 is a lateral air inlet opening 68 through which air can pass that replaces the air blown out by the rotating sanding disk 28 to remove sanding dust. Relative to the sanding disk 28, the air inlet opening 68 is located opposite from the dust removal tube 52. In a state lying on the flat work piece 30 in the operating position, the air inlet opening 68 has a size that does not depend on the depth of penetration of the sanding disk 68 in the work piece 30, since the rail 50—which, together with the protective cover 40, borders the air inlet opening 68—always lies flat on the work piece 30 independent of the depth of penetration of the sanding disk 28 in the work piece 30.

The window 66 is inserted in frame segments 70 fastened to the pivoted cover plate 64, and it engages with the pivoted cover plate 64 in captive fashion with a snap-in tongue 72 extending above it.

Figure 4:
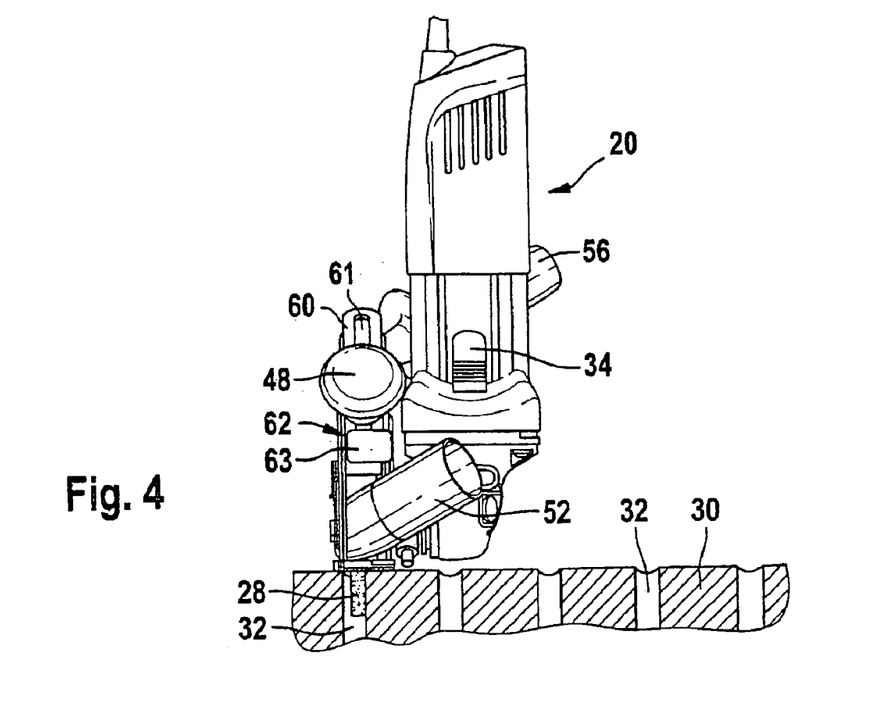
FIG. 4 is the view according to FIG. 3 rotated by 90° around the vertical axis.

FIG. 4 shows a side view, rotated by 90°, of the angle grinder 20 according to FIG. 3, whereby, in contrast to the preceding figures, the design of the guide rule 60 comprising a central slot 61—for swivelling the knob 48 vertically and/or for moving the depth-of-cut stop 62 with its push button 63—is shown. The sanding disk 28 is also shown penetrating the groove 32, which said groove is designed as a mortar joint. The rest of the details explained hereinabove are labelled with reference numerals but will not be explained once more.

Figure 5:
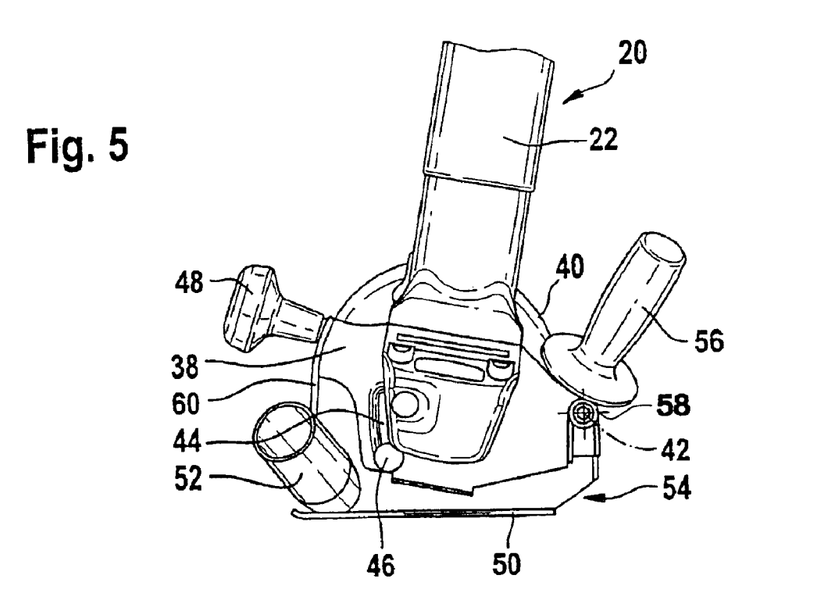
FIG. 5 is the view according to FIG. 1 in the resting position.

FIG. 5 shows the angle grinder 20 according to FIG. 1 with the protective cover 40 in the resting position, in which the sanding disk 28 has disappeared inside the protective cover 40, because the swivelling arm 38 has been moved upward relative to the protective cover 40. This is made particularly clear when the relative position of the guide bolt 46 to the guide slot 44 according to FIG. 5 is compared with said relative position of the guide bolt to the guide slot in FIG. 1.

Figure 6:
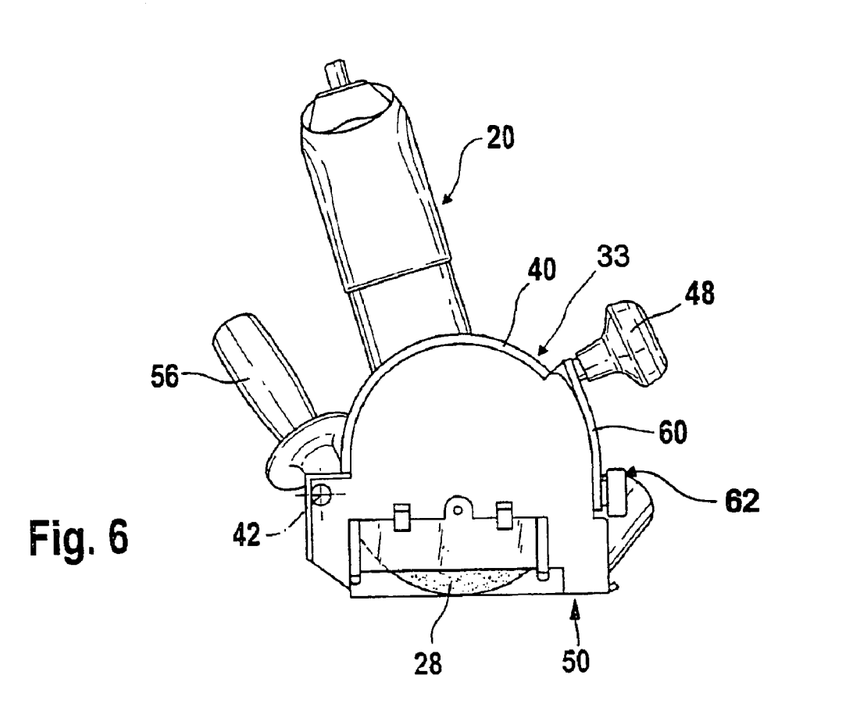
FIG. 6 is the view according to FIG. 5 from the opposite side.

FIG. 6 shows how the sanding disk 28—located behind the rail 50—is positioned within the contour of the protective cover 40.

In FIGS. 5 and 6, the resting position of the protective cover 40 is recognizable by the fact that the knob 48—as viewed here—is seated against the upper stop of the guide rule 60.

Figure 7:
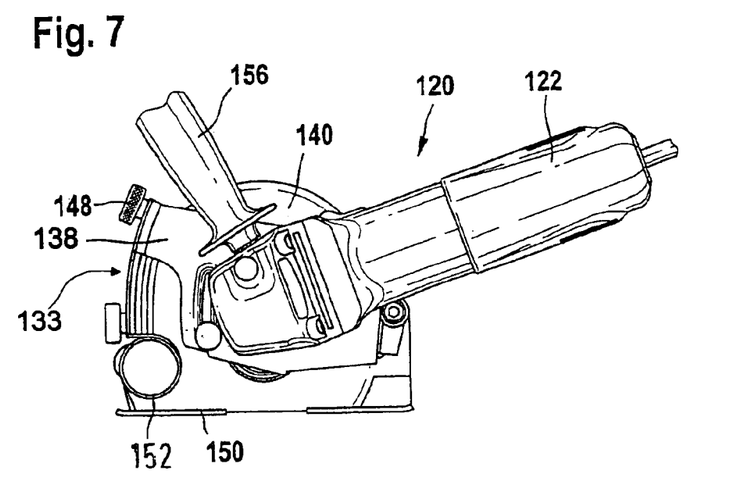
FIG. 7 is the side view of a further exemplary embodiment of a power tool having a guard device according to the invention, in the resting position.
Figure 8:
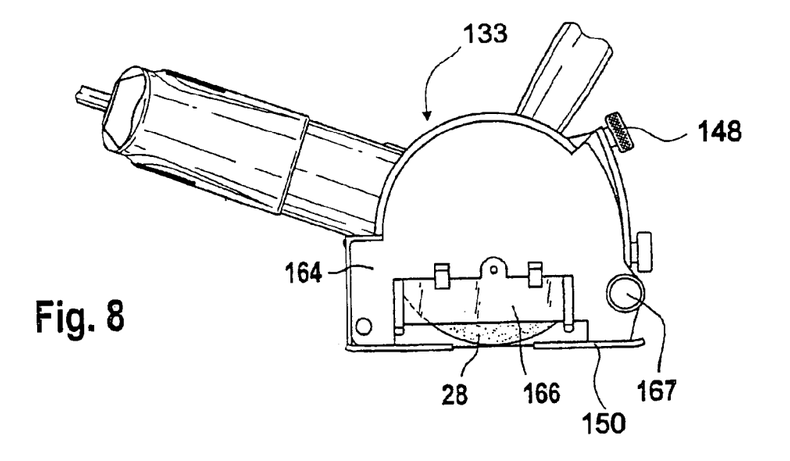
FIG. 8 is the view according to FIG. 7 from the opposite side.

FIGS. 7 and 8 show an exemplary embodiment that is slightly modified as compared with FIGS. 1 through 6, comprising a guard device 133, in the case of which a dust removal tube 152 projecting out of the protective cover 140 at a right angle is provided, which said dust removal tube is provided for suctioning purposes using a separate vacuum cleaner. Moreover, an elongated, stem-like handle 156 is attached directly to the angle grinder 120 in order to make two-handed operation of the angle grinder 120 possible, whereby one hand can grasp the handle 156, and the other hand can grasp the motor housing 122. Moreover, the swivelling arm 138 is provided with a knurled nut 148 instead of a knob, with which said knurled nut the preselected depth of cut can be adjusted. Located on the underside of the protective cover 140 is a rail 150 for guidance on a work piece 30 shown in FIG. 10.

FIG. 8 shows the view according to FIG. 7 from the opposite side, whereby, in contrast to FIG. 3 of the first exemplary embodiment, the window 166 is capable of being secured by means of a knurled nut.

Figure 9:
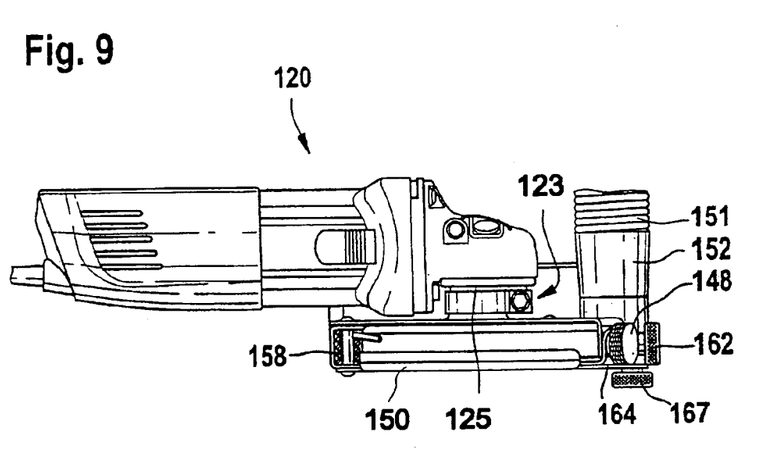
FIG. 9 is the view according to FIG. 8 rotated 90° around the longitudinal axis.
Figure 10:
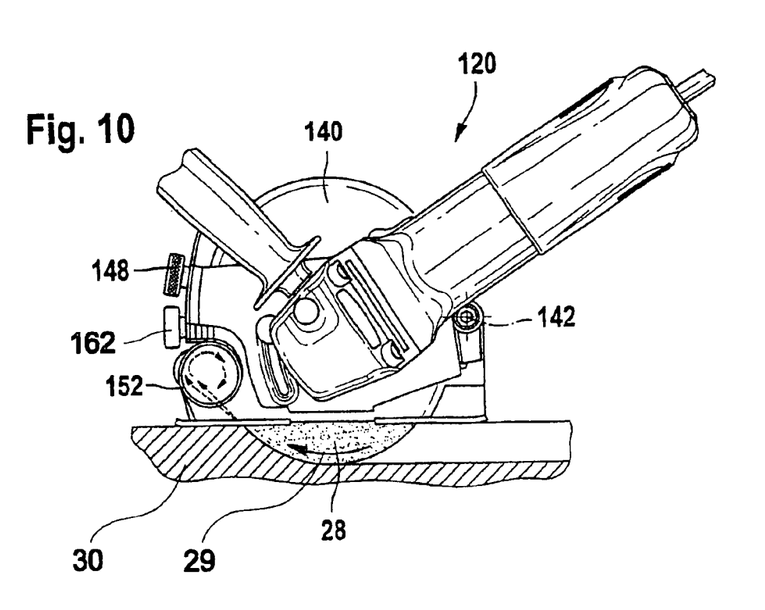
FIG. 10 is the view according to FIG. 7 in the working position.

FIGS. 7 and 8 show the angle grinder 120 with the protective cover 140 in the resting position, i.e., with the sanding disk 28 drawn into the protective cover 140, while FIGS. 9 and 10 show the same angle grinder 120 in the working position, i.e., with the sanding disk 28 protruding below the rail 150.

FIG. 9 clearly shows a collet 123 that clamps a collar of the protective cover 140 tightly against the neck 125 of the angle grinder 120. The protective cover 140 is easy to remove by loosening a hexagon bolt and opening the collet 123 away from the neck 125 of the angle grinder 120 if the sanding disk 28 was previously removed. Also shown are the knurled nut 167 for holding the pivoted cover plate 164 in position against the protective cover 140, the knurled nut 148 for setting and releasing the preselected depth of cut, and the depth-of-cut stop capable of being adjusted using the knurled nut 162.

FIG. 9 clearly shows the leg spring 158, with which the angle grinder 120 is automatically moved relative to the protective cover 140 around the center of rotation 142 into the resting position. Also shown is a suction tube 151 for connection to a vacuum cleaner, with which the sanding dust can be effectively removed.

FIG. 10 shows the angle grinder 120 in the working position, whereby sanding dust is thrown in the direction of rotation 29 of the sanding disk 28 tangentially from the point where the sanding disk 28 exits the work piece 30 and against the interior wall of the dust removal tube 152, and from there, it is capable of being suctioned off easily via the suction tube.

Figure 11:
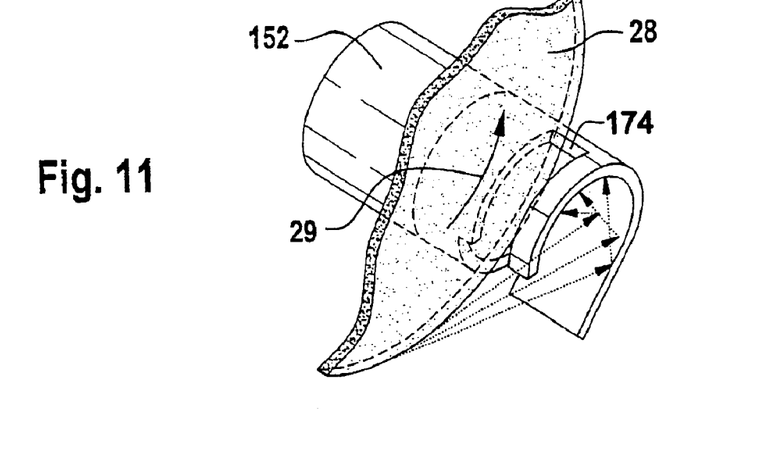
FIG. 11 is a detailed view of the dust removal tube acoding to FIGS. 7 and 10.

FIG. 11 shows a detained view of the dust removal tube 152 in its position relative to the sanding disk 28. One can see that the radially outermost region of the sanding disk 28 extends into an opening 174 of the dust removal tube 152. Part of the dust removal tube 152 therefore penetrates the planes—imagined to continue endlessly—of the two flat sides of the sanding disk 28. The opening 174 is designed in such a fashion that part of the dust removal tube 152 reaches behind the sanding disk 28. The opening 174 is therefore designed in the shape of a slot.

The conveying air stream produced by the sanding disk 28—together with dust particles—meets the bent surface of the part of the dust removal tube 152 that penetrates the planes of the two flat sides of the sanding disk 28, as indicated by the arrows. The conveying air stream with the sanding dust meeting this impact surface at a high rate of speed is further directed into the dust removal tube 152 in such a fashion that it executes a cyclone-like vortex motion in the dust removal tube. The conveying air and dust stream set into rotational motion in this fashion has sufficient kinetic energy to exit the dust removal tube 152 on its side furthest from the angle grinder 20 under its own power. A vacuum cleaner can be installed downstream for safety reasons, however, to prevent the dust removal tube 152 from becoming blocked in certain working positions of the angle grinder 120.

Figure 12:
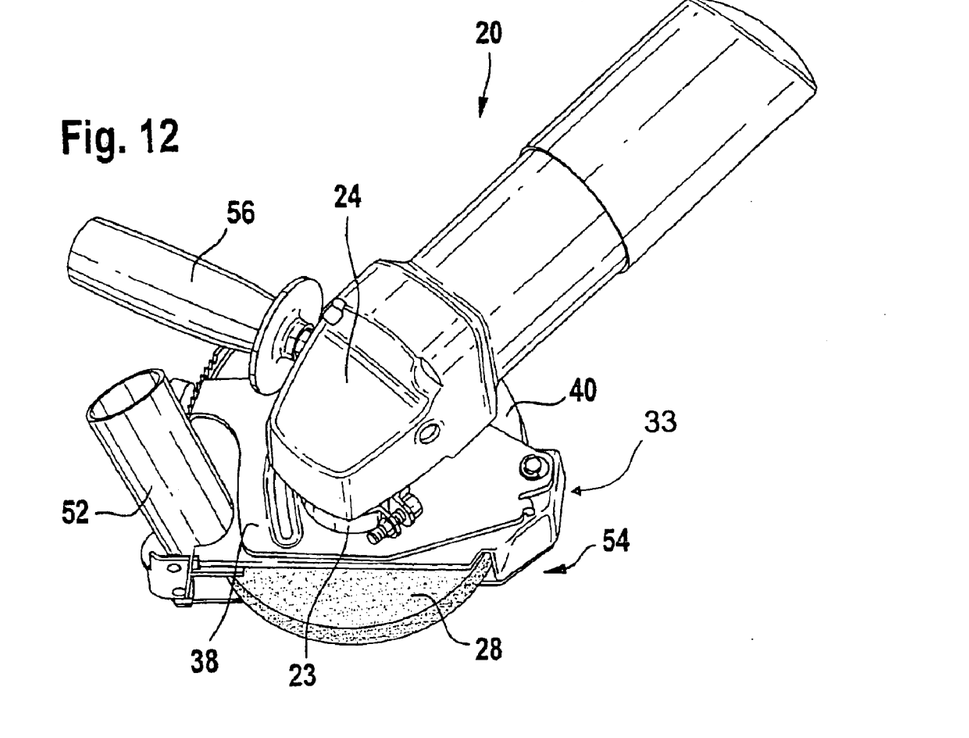
FIG. 12 is a spatial representation according to FIG. 1.

FIG. 12 shows a side view of a further exemplary embodiment, the design of which essentially matches that of the angle grinder 20 shown in FIGS. 1 through 4. The only differences are that the stem-like handle 56 is screwed directly onto the gearbox housing 24 of the angle grinder 20, and the knob is missing. The collet 23 and the locking screw that hold the angle grinder 20 tightly in position relative to the protective cover 40 are particularly easy to see.

Figure 13:
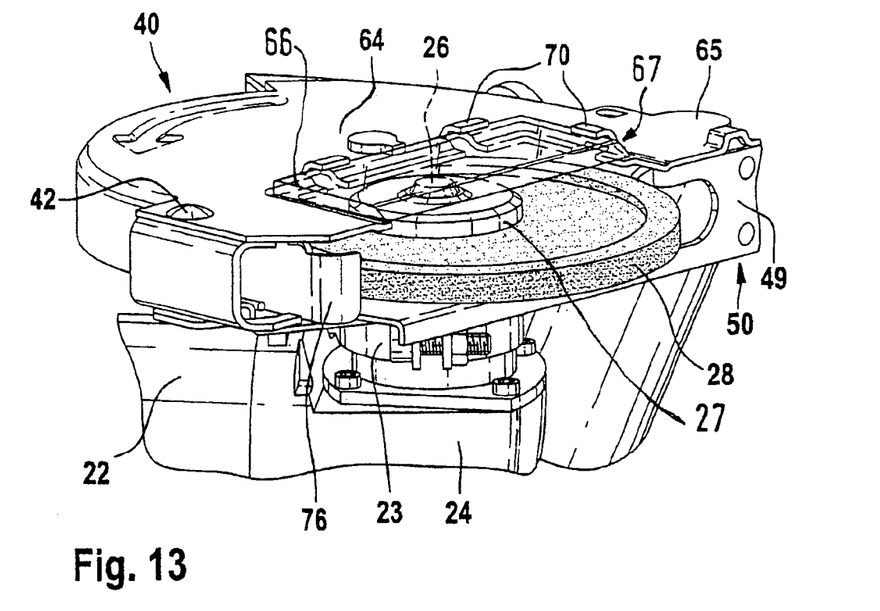
FIG. 13 is a spatial view from below according to FIGS. 1 and 2.

FIG. 13 shows a spatial representation nearly parallel to the sanding disk 28 from the underside of the protective cover 40. The design of the rail 50 with a glide shoe 49 is shown particularly clearly. The rail 50 is located in the exit region of the protective cover 40, where part of the sanding disk exits the protective cover 40 during operation. The glide shoe 49 of the rail 50 constricts the cross section of the exit region of the protective cover 40. This helps the air stream in the protective cover 40 along in the direction toward the dust removal tube 52.

As shown on the left side, a damping plate 76 is located next to the sanding disk 28, which said damping plate extends radially very close to the periphery of the sanding disk 28 and dampens a movement of air caused by the rotating sanding disk 28 during sanding. As a result, a certain vacuum is produced inside the protective cover 40, which said vacuum blows through the dust removal tube 52 and takes any sanding dust present along with it.

The collet 23 with the clamping nut for fastening the protective cover 40 to the gearbox housing 24 is shown. On the top, the protective cover 40 is covered horizontally with the pivoted cover plate 64 made of sheet metal, attached to which said pivoted cover plate—as shown on the right side—is a round, projecting swivel grip 65 to be operated using the thumb.

As shown on the left side, an arrow indicating the direction of rotation is stamped in the pivoted cover plate 64 that points to the left in the view shown. This is the intended direction of rotation for swivelling the pivoted cover plate 64 upward into its release position to remove the sanding disk 28. Additionally, the arrow also indicates the direction of rotation of the sanding disk 28. The pivoted cover plate 64 is swung to the left by approximately 180° around the center of rotation 42 so that the sanding disk 28 can be exposed and replaced after the retaining nut 27 is removed.

The frame segments 70 for accommodating the window 66 in the corresponding opening are also clearly shown.

FIG. 14 shows the guide rule 60 as a fixed part of the protective cover 40, relative to which the swivelling arm 38 can be adjusted via swivelling. The position of the swivelling arm 38 relative to the guide rule 60 can be fixed and/or released using the knurled thumb screw 48a and/or using the knob 48 shown in FIGS. 1 through 4 by turning them around their axes.

The push button 63 of the depth-of-cut stop 62 can be engaged in the toothed rack-like outer contour 59 by way of a mirror-image profile, and it can be disengaged with spring action by pressing on the push button 63. If pressure on the push button 63 is released, it automatically engages with its mating profile 79 in the toothed rack-like outer contour 59 in the respective position. The depth-of-cut stop 62 can be fixed in position at any position along the guide rule 60, so that the swivelling arm 38 with its knurled thumb screw 48a can only be swivelled up to said stop. With this, a reproducible depth of cut is established.

FIG. 15 shows a detained view of the depth-of-cut stop 62 with its push button 63 and a profile carrier 78 made of sheet metal that forms the mating profile 79 for engaging in the toothed rack-like outer contour 59 of the guide rule 60. A tab 80 is located on each of the opposite sides of the profile carrier 78, which said tabs fit in the center slot 61 of the guide rule 60 for guided engagement. The profile carrier 78 is penetrated transversely by a guide bolt 82, along which it can be moved toward the push button 63 and away from said push button. The push button 63 is preloaded elastically by means of a spiral-coiled spring 83.

The push button 63 and the profile carrier 78 are securely braced against each other, whereby, in the assembled state, the guide rule 60 runs along between the two. The spiral-coil spring 83 with a support disk 84 comes to bear at the top against the guide rule 60 and, when the push button 63 is operated, it moves in an axially spring-loaded fashion relative to the guide rule 60, so that the profile carrier 78 with its mating profile 79 can disengage from the outer contour 59 of the guide rule 60.

Figure 16:
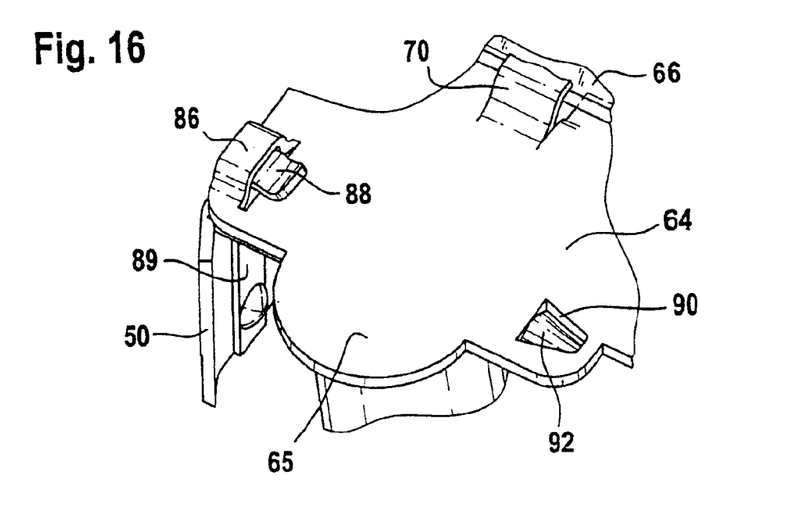
FIG. 16 shows a section of the pivoted cover plate.

FIG. 16 shows a section of a spatial representation of the swivel grip 65 of the pivoted cover plate 64. It is formed by part of the pivoted cover plate 64. As shown on the left, the pivoted cover plate 64 comprises a tab 86 bent outwardly upward, through which a flexible tongue 88 of an L-shaped leaf spring 89 extends, which said leaf spring is interconnected flatly with the rail 50, i.e., they are riveted together in this case.

One of the frame segments 70 into which the window 66 can be inserted is shown at the top.

An opening 90 in the pivoted cover plate 64 is shown on the right side, which said opening snaps into place over a detent lobe 92 that extends out of the adjacent side wall of the protective cover 40. By swiveling the pivoted cover plate 64 using the swivel grip 65 to the right as viewed here, the tab 86 can glide over the flexible tongue 88, and the opening 90 can overcome the detent lobe 92, so that the pivoted cover plate 64 can then be rotated around the center of rotation 42 (FIG. 13) with minimal force.

Figures 17, 18:
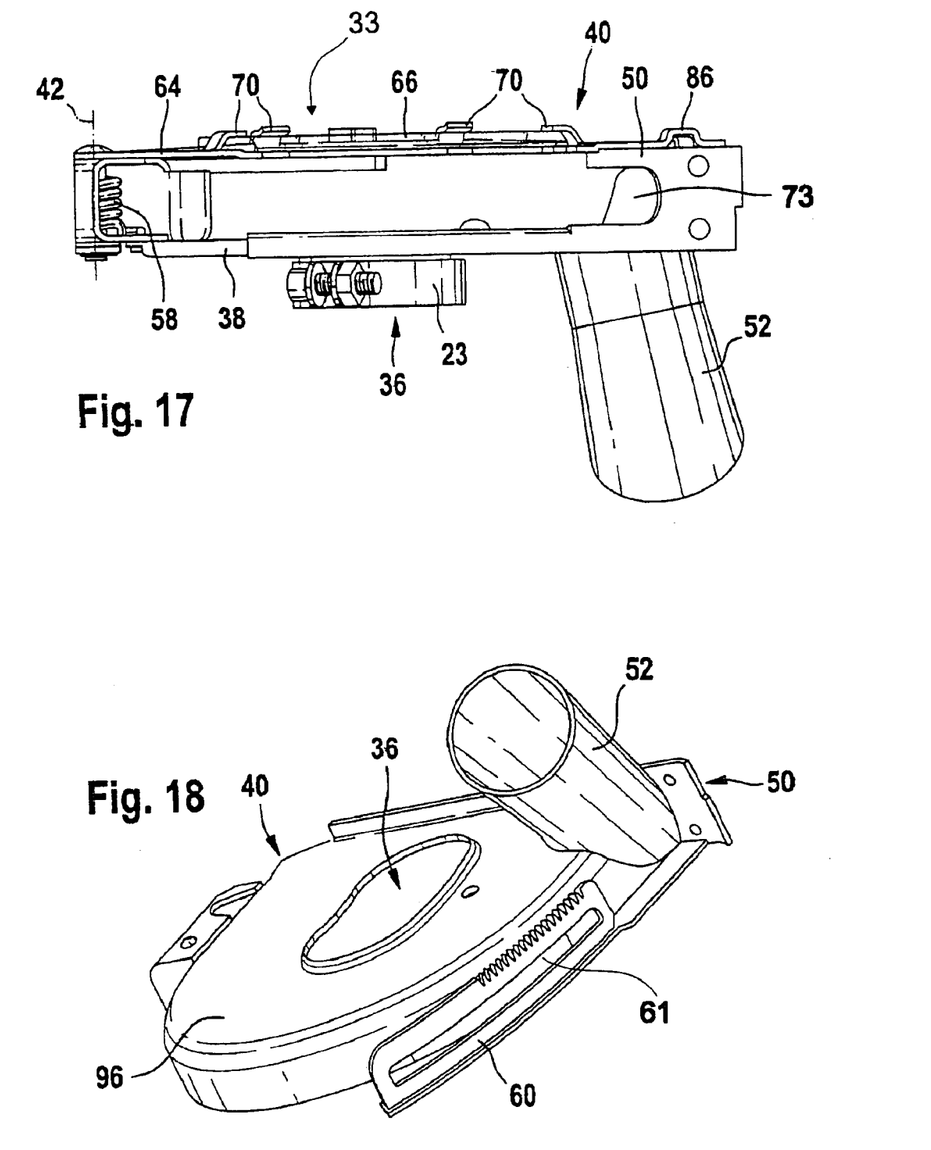
FIG. 17 is a bottom view of the angle grinder protective cover according to FIG. 1.
FIG. 18 shows a side shell of the protective cover as seen from the outside.

FIG. 17 shows an underside view of the protective cover 40 with the top view of the runner-like rail 50. Its surface forms a pass-through slot 73 through which the not-shown sanding disk 28 can enter and exit.

Shown at the bottom is the collet 23 with the pass-through opening 36 for accommodating the neck 25 of the angle grinder 20 (FIG. 1). The leg spring 58 is shown at the outer left, which said leg spring tries to swivel the swivelling arm 38 around the center of rotation 42, while the dust removal tube 52 projects in the lower right-hand side of the drawing. The dust removal tube 52 tapers toward its mouth pointing toward the sanding disk 28. As a result, the conveying air stream produced by the sanding disk 28 flows rapidly in the axial direction of the dust removal tube 52 through the constriction in the mouth of the dust removal tube 52. It therefore leaves the inside of the protective cover 40 at great speed, whereby it executes the rotational motion described with FIG. 11. Due to the widening of the dust removal tube in the direction away from the protective cover 40, the air stream develops a suction effect due to its rotation, which said suction effect helps the air to exit the protective cover and enter the dust removal tube 52.

The protective cover 40 is covered on the top by the pivoted cover plate 64, the frame segments 70 of which project upwardly and hold the window 66. Additionally, the tab 86 is shown on the pivoted cover plate 64 at the top right.

FIG. 18 shows a detained view of the stationary, shell-like side part 96 of the protective cover 40, to which the welded-on guide rule 60 is attached as shown on the right.

The runner-like region of the rail 50 and the dust removal tube 52 can be seen in the upper right. Shown particularly clearly here is the arrangement of the suction tube in the outermost corner of the protective cover 40, at the site of origination of the sanding dust when the angle grinder 20 is used, through which said suction tube any sanding dust created moves by means of the high natural speed imparted by the sanding disk 28 in conjunction with the blast air stream produced by the sanding disk 28 itself.

Located approximately in the middle of the side part 96 is the pass-through opening 36, through which the neck 25 of the angle grinder 20 extends. The pass-through opening 36 is a slot that allows the angle grinder 20 and/or the neck 25 to swivel up and down relative to the protective cover 40 until the maximum depth of cut is reached.

Figure 19:
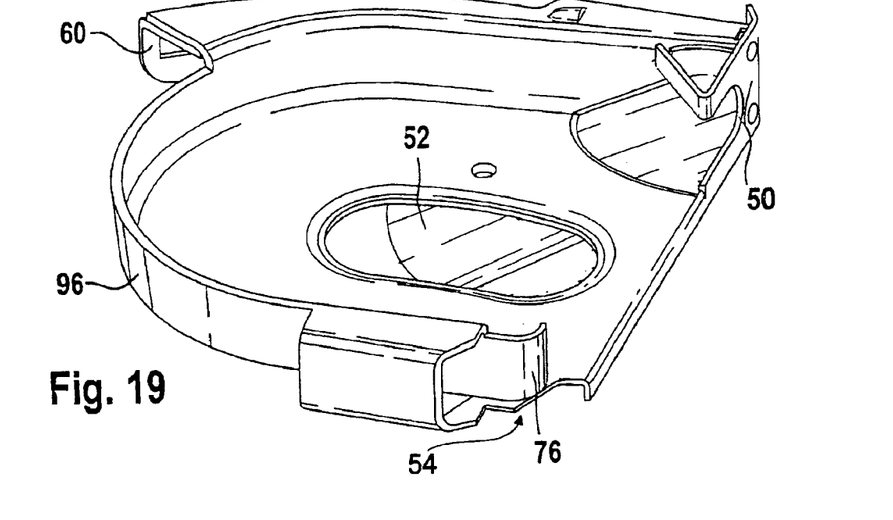
FIG. 19 shows the housing shell according to FIG. 18 as seen from the inside.

FIG. 19 shows the side part 96 as viewed from the inside, whereby the rail 50, the dust removal tube 52, and the guide rule 60 are shown particularly clearly. Moreover, the damper plate 76 and the observation opening 54 are shown on the outermost side of the side part 96.

Figure 20:
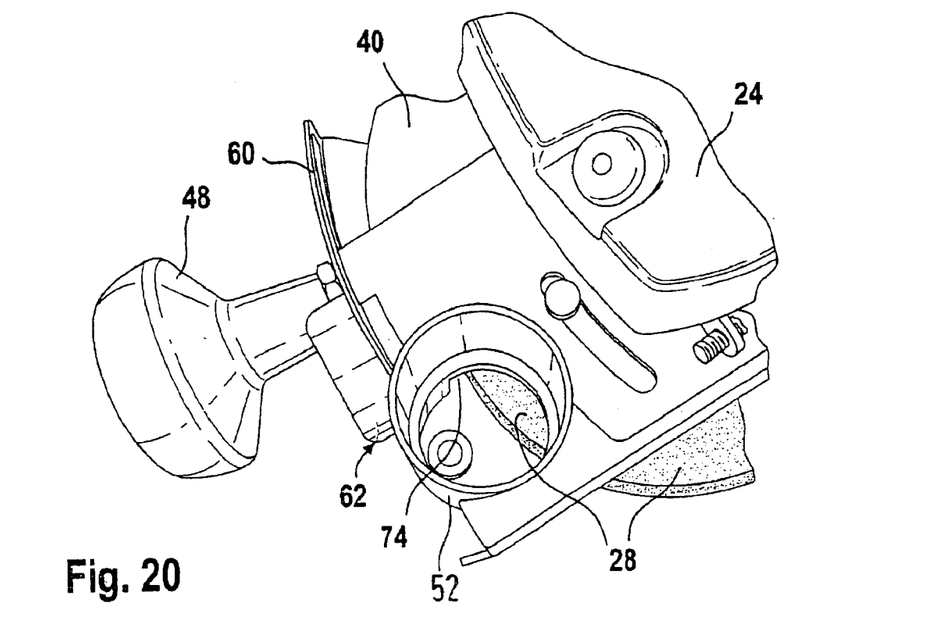
FIG. 20 is a spatial representation of the anterior region of the sanding machine comprising dust removal tube extending at a slant relative to the sanding tool.

FIG. 20 is a side view of the protective cover 40 showing a section in the region of the gearbox housing 24 of the angle grinder 20. Also shown clearly is the knob 48 for guiding the protective cover 40 and/or for adjusting a preselected depth of cut and the depth-of-cut stop 62.

Also shown is the dust removal tube 52, in the circumferential contour of which the sanding disk 28 passes through the opening 74 with its radially outermost region.

Reference numerals

20 Angle grinder
22 Motor housing
23 Collet
24 Gearbox housing
25 Neck
26 Drive shaft
27 Retaining nut
28 Sanding disk
29 Direction of rotation
30 Work piece
32 Groove
33 Guard device
34 Sliding button
36 Mounting opening
38 Swivelling arm
40 Protective cover
42 Center of rotation
44 Guide slot
46 Guide bolt
48 Knob
48a Knurled thumb screw
49 Glide shoe
50 Rail
52 Dust removal tube
54 Observation opening
56 Handle
57 Advancing direction
58 Leg spring
59 Outer contour
60 Guide rule
61 Slot
62 Depth-of-cut stop
63 Push button
64 Pivoted cover plate
65 Swivel grip
66 Window
68 Air inlet opening
70 Frame segment
72 Snap-in tongue
73 Pass-through slot
74 Opening
76 Damping plate 78 Profile carrier
79 Mating profile
80 Tab
82 Guide bolt
83 Spiral-coiled spring
84 Support disk
86 Tab
88 Flexible tongue
90 Recess
92 Detent lobe
96 Side part
120 Angle grinder
122 Motor housing
123 Collet
125 Neck
133 Guard device
138 Swivelling arm
140 Protective cover
142 Center of rotation
148 Knurled nut
150 Rail
152 Dust removal tube
156 Handle
158 Leg spring
162 Knurled nut
164 Pivoted cover plate
166 Window
167 Knurled nut
174 Opening

What is claimed is:

1. A guard device (33) for a power tool, comprising;
a protective cover (40) configured to at least partially encompass a disk-shaped, rotating tool having two flat sides defined by two corresponding planes, and an axis of rotation;
a dust removal tube (52) having a longitudinal axis located at an angle of up to 80 degrees to said axis of rotation of said rotating tool;
wherein said dust removal tube (52) extends along said longitudinal axis pass behind said rotating tool, penetrating transversely both planes of said two flat sides such that a radially outermost region of the rotating tool extends into an opening (74,174) of the dust removal tube in a form of a slot transverse to said longitudinal axis, so that dust drawn off a work piece is set into a rotational motion in the dust removal tube.

2. The guard device (33) according to claim 1, wherein the dust removal tube (52) includes a mouth, and wherein the dust removal tube (52) tapers toward the mouth pointing toward the work piece.

3. The guard device (33) according to claim 1, further comprising a fastening device to fasten the protective cover (40) to the power tool, whereby the dust removal tube (52) is moveably supported relative to the fastening device.

4. The guard device (33) according to claim 1, wherein the dust removal tube (52) is fastened to the protective cover (40).

5. The guard device (33) according to claim 1, wherein the protective cover (40) encompasses the rotating tool together with a flat work piece (30) to an extent that does not depend on the depth of penetration of the rotating tool in the flat work piece (30) when the protective cover is lying on the flat work piece in an operating position.

6. The guard device (33) according to claim 1, wherein the protective cover (40) comprises an exit region in which the rotating tool partially exits the protective cover (40) during operation, and the protective cover (40) comprises a glide shoe (49) in the exit region, whereby the dust removal tube (52) is permanently interconnected with the glide shoe (49).

7. The guard device (33) according to claim 6, wherein the glide shoe (49) narrows the cross section of the exit region in a region of the dust removal tube (52).

8. The guard device (33) according to claim 1, wherein the protective cover (40) comprises an air inlet opening (68) when the protective cover is lying on a flat work piece in an operating position, wherein a size of the air inlet opening is independent of the depth of penetration of the rotating tool in the work piece (30).

9. The guard device (33) according to claim 8, wherein the air inlet opening (68) is located opposite from the dust removal tube (52) relative to the rotating tool.

10. The guard device (33) according to claim 1, further comprising a damping plate (76) secured to the protective cover (40).

11. An angle grinder comprising;
a guard device (33) including a protective cover (40) configured to at least partially encompass a disk-shaped, rotating tool having two flat sides defined by two corresponding planes, and an axis of rotation,
said guard device further including a dust removal tube (52) having a longitudinal axis located at an angle of up to 80 degrees to said axis of rotation of said rotating tool;
wherein said dust removal tube (52) extends along said longitudinal axis pass behind said rotating tool, penetrating transversely both planes of said two flat sides such that a radially outermost region of the rotating tool extends into an opening (74, 174) of the dust removal tube in a form of a slot transverse to said longitudinal axis, so that sanding dust drawn off a work piece is set into a rotational motion in the dust removal tube.

* * * * *